United States Patent
Yoffe et al.

(10) Patent No.: US 11,784,859 B2
(45) Date of Patent: Oct. 10, 2023

(54) BLUETOOTH RECEIVER, ELECTRONIC DEVICE AND METHOD FOR A BLUETOOTH RECEIVER

(71) Applicant: Intel Corporation, Santa Clara, CA (US)

(72) Inventors: Yaron Yoffe, Rishon LeTsiyon (IL); Avishay Friedman, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/455,981

(22) Filed: Nov. 22, 2021

(65) Prior Publication Data

US 2022/0200829 A1 Jun. 23, 2022

(30) Foreign Application Priority Data

Dec. 23, 2020 (EP) .................................... 20216836

(51) Int. Cl.
  *H04L 27/00* (2006.01)
  *H04L 27/148* (2006.01)
(52) U.S. Cl.
  CPC ........ *H04L 27/0014* (2013.01); *H04L 27/148* (2013.01); *H04L 2027/0026* (2013.01)
(58) Field of Classification Search
  CPC ............... H04L 27/0014; H04L 27/148; H04L 27/0002

USPC .......................................................... 375/262
See application file for complete search history.

(56) References Cited

U.S. PATENT DOCUMENTS

| | | | |
|---|---|---|---|
| 6,947,497 B1 * | 9/2005 | Ahn | H04L 25/03057 375/326 |
| 10,218,551 B1 * | 2/2019 | Sethi | H04L 27/2335 |
| 2003/0185158 A1 * | 10/2003 | Lucas | H03J 7/065 370/252 |
| 2005/0207519 A1 | 9/2005 | Phang et al. | |
| 2006/0115021 A1 | 6/2006 | Puma et al. | |
| 2015/0222464 A1 | 8/2015 | Liu et al. | |
| 2017/0187562 A1 | 6/2017 | Lu et al. | |
| 2018/0048406 A1 * | 2/2018 | Kikuzuki | H01Q 3/26 |

* cited by examiner

*Primary Examiner* — Leila Malek
(74) *Attorney, Agent, or Firm* — 2SPL Patent Attorneys PartG mbB; Kieran O'Leary

(57) ABSTRACT

A Bluetooth receiver is provided. The Bluetooth receiver comprises processing circuitry configured to receive a receive signal and to determine receive symbols based on the receive signal. The Bluetooth receiver further comprises control circuitry configured to determine a frequency offset and/or a modulation index of the receive signal based on the receive signal. The control circuitry is additionally configured to control an operation mode of the processing circuitry based on the determined frequency offset and/or the modulation index of the receive signal.

16 Claims, 8 Drawing Sheets

BLUETOOTH RECEIVER, ELECTRONIC DEVICE AND METHOD FOR A BLUETOOTH RECEIVER

CROSS-REFERENCE TO RELATED APPLICATIONS

This application claims priority to European Application 20216836.5, filed on Dec. 23, 2020. The content of this earlier filed application is incorporated by reference herein in its entirety.

FIELD

The present disclosure relates to operation control for Bluetooth receivers. In particular, examples relate to a Bluetooth receiver, an electronic device and a method for a Bluetooth receiver.

BACKGROUND

Bluetooth (BT) is based on phase modulation, e. g. on Gaussian Frequency Shift Keying (GFSK) for basic rate (BR) or on Differential Phase Shift Keying (DPSK) for enhanced data rate (EDR). The BT standard may permit large variations within a modulation of a packet that may result in an increased time consumption for further processing (e.g. performing a specific test) of the packet performed by a BT receiver. Thus, a BT receiver with improved packet processing capabilities may be desired.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of the group A and B". The same applies for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
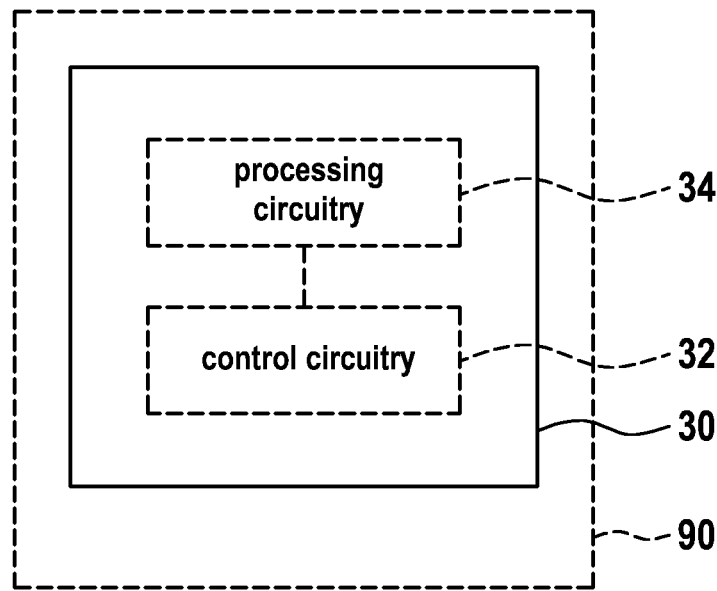
FIG. 1 shows a block schema of an example of a BT receiver.

FIG. 1 shows a block schema of an example of a BT receiver 30. The BT receiver 30 comprises processing circuitry 34 configured to receive a receive signal and to determine receive symbols based on the receive signal. Further, the BT receiver 30 comprises control circuitry 32 configured to determine a frequency offset and/or a modulation index of the receive signal based on the receive signal. Further, the control circuitry 32 is configured to control an operation mode of the processing circuitry 34 based on the determined frequency offset and/or the modulation index of the receive signal. For example, the control circuitry 32 may be adapted to adaptive/on-the-fly control the operation mode of the processing circuitry 34. Adjusting the operation mode of the processing circuitry 34 based on at least one of the determined frequency offset and the modulation index of the receive signal may allow to adapt the signal processing within the processing circuitry 34 to the condition/state of the receive signal. Accordingly, processing of the receive signal by the processing circuitry 34 may be improved. For example, by determining the frequency offset a tracking loop, e.g. a frequency tracking loop, may be advantageously adapted to the determined frequency offset. By determining the frequency offset the frequency tracking loop of the BT receiver 30 may be improved by adapting a parameter for the frequency tracking loop. For example, a frequency tracking loop may be adapted for a dirty signal (e.g. BGB test) or for a clean signal (e.g. desired operation mode). By determining the modulation index the phase tracking loop of the BT receiver 30 may be improved by adapting a parameter for the phase tracking loop. Thus, the performance of the BT receiver 30 may be improved by adapting the operation mode of the BT receiver based on at least one of the frequency offset and the modulation index.

The receive signal may be a signal transmitted from a BT transmitter. Thus, the receive signal may be a modulated signal according to the BT standard, e.g. modulated by GFSK or DPSK. For example, the processing circuitry 34 may be configured to demodulate the receive signal.

The processing circuitry 34 may comprise a frequency estimator configured to estimate a frequency of the receive signal. For example, the frequency estimator may estimate for every symbol a frequency. An estimated frequency determined by the frequency estimator may be send to the control circuitry 32.

The control circuitry 32 may comprise a phase lock detector circuitry configured to determine the frequency offset of the receive signal based on a frequency of the receive signal. For example, the determination may be based on the estimated frequency. The frequency offset may be determined by comparison of the estimated frequency of two symbols, e.g. by a difference of the frequencies of these symbols.

The phase lock detector circuitry may be further configured to determine the frequency offset of the receive signal based on a maximum frequency and a minimum frequency of the receive signal. For example, the phase lock detector circuitry may determine the frequency offset based on the maximum frequency value of all symbols and on the minimum frequency value of all symbols, e.g. by subtraction of these both values.

The phase lock detector circuitry may be further configured to determine the frequency offset of the receive signal based on a frequency drift of the receive signal over time. The phase lock detector circuitry may operate in three different operation modes for determining the frequency offset over time. The operation modes may differ by a number of symbols used for determining the frequency offset. For example, the phase lock detector circuitry may use 32, 64 or 128 symbols, for determining the frequency offset. Thus, the phase lock detector circuitry may determine the frequency offset over different time periods, e.g. over a time period of 32 symbols. The frequency offset may be determined by subtracting the minimum frequency value of all symbols from the maximum frequency value of all symbols for a given period. Hence, a likelihood for an increased frequency offset may increase with the number of symbols used for the time period. For example, a higher frequency offset may be more probable for a period comprising 128 symbols than for a period comprising 32 symbols.

The phase lock detector circuitry may be further configured to compare the frequency offset with a threshold and if the frequency offset is larger than the threshold, send the determined frequency offset to the processing circuitry 34. Thus, a use of the threshold may increase a sensitivity for sending the frequency offset to the processing circuitry 34. For example, the threshold may depend on the time period used for determining the frequency offset, e.g. the threshold may be larger for a time period with more symbols as for a time period with less symbols.

The phase lock detector circuitry may estimate the transmitter frequency drift by determining the frequency offset. Thus, by determining the frequency offset a performance of the BT receiver 30 may be improved by improving a frequency tracking loop, e.g. by adapting a parameter of the frequency tracking loop. To adapt the parameter of the frequency tracking loop the phase lock detector circuitry may send information, e.g. about the frequency offset, to the control circuitry 32, e.g. to a differential demodulator circuitry and/or a phase tracker circuitry, and their operation mode may be changed accordingly. The phase lock detector circuitry may be used to improve the performance of a BT receiver 30 for receiving the receive signal which may be modulated based on GFSK or DPSK.

The control circuitry 32 may comprise a modulation index tracker circuitry configured to determine the modulation index of the receive signal. When the modulation index may be unknown, the BT receiver 30 may have to go through an adaptation period to search for the modulation index. By determining the modulation index this adaption period may be omitted and thus the phase tracking loop may be adapted to the determined modulation index. This may improve the BT receiver 30 performance, e.g. by decreasing a time consumption of the phase tracking loop.

To overcome the issue with the adaption period an initial modulation error $\eta$ based on Access Code may be applied. The modulation index tracker circuitry may be further configured to determine the modulation index based on a modulation error of the receive signal.

Further, to reduce an $\eta$ estimation error a supplement $\eta$ track may be used in a demodulator (e.g. the differential demodulator circuitry). The modulation index tracker circuitry may be further configured to determine the modulation index based on a phase error of the received signal. The modulation error may be translated to a phase error (residual error) which may be data depending. The modulation index tracker circuitry may be further configured to determine the phase error of the received signal based on the modulation error of the received signal. The $\eta$ track may apply an offset to $\eta$ proportional to a deviation of the estimated phase error from its average. The modulation index tracker circuitry may be further configured to determine the modulation index based on an averaging factor.

For $\eta$ track with an applied offset proportional to the phase error for a GFSK signal, a next transmitter phasor may be $$\phi_t[n+1] = \phi_{s_j}[n] e^{j\pi \eta b_{s_j,t}[n]},$$

with $b_{s,t}[n] \in \{-1; 1\}$, bit transition from source state (index "s") to target state (index "t").

Assuming a modulation index error $\eta_{er}$ may lead to $$\eta_{tx} = \eta_{rx} + \eta_{er},$$

$$\phi_t[n+1] = \phi_{s_j}[n] e^{j\pi(\eta_{rx}+\eta_{er})b_{s_j,t}[n]} = \hat{\phi}_t[n+1] e^{j\pi \eta_{er} b_{s_j,t}[n]},$$

where $$\hat{\phi}_t[n+1] = \phi_{s_j}[n] e^{j\pi \eta_{rx} b_{s_j,t}[n]}.$$

The phase error due to $\eta_{er}$ may be $$\eta_{er} \propto \sphericalangle(\phi_t[n+1] \cdot \hat{\phi}_t[n+1]^*) \cdot \hat{b}_{s_j,t}[n] \approx \sphericalangle(y_{s_j}[n] \cdot \hat{y}_{s_j,t}^*[n]) \cdot \hat{b}_{s_j,t}[n] \approx \omega_t[n+1] \cdot \hat{b}_{s_j,t}[n],$$

where other sources for the phase error e. g. carrier frequency offset (CFO), phase noise (PN) were neglected.

To compensate for other phase error sources, average $\omega_t$, $\omega_t^{ave}$ may be subtracted:

$$\hat{\eta}_{er} \propto (\omega_t[n+1] - \omega_t^{ave}) \cdot \hat{b}_{s_j,t}[n].$$

Applying an averaging factor a leads to an estimator of the modulation index:

$$\hat{\eta} = \eta_{rx} + \alpha \cdot \hat{\eta}_{er}.$$

The estimator of the modulation index may be stored in Look up Tables (LUTs). For example, in the LUTs may be stored $\pi\eta$, the real part of the estimator of the modulation index hReal and the imaginary par of the estimator of the modulation index hImag in LUTs for each modulation index (e.g. for BR: $\eta$ range from 0.28 to 0.35 with increments of 0.01; for BLE: $\eta$ range from 0.45 to 0.55 with increments of 0.01). By storing the estimator of the modulation index in LUTs an access and/or use of the estimator of the modulation index may be facilitated.

The processing circuitry 34 may comprise differential demodulator circuitry configured to generate a demodulated receive signal by demodulating the receive signal and the control circuitry 32 may be configured to adjust an operation mode of the differential demodulator circuitry based on the determined frequency offset and/or the modulation index. The differential demodulator circuitry may be a circuitry with different operation modes, thus the operation mode of the differential demodulator circuitry may be adjustable, e.g. by the controlling circuitry. The different operation modes may be optimized for different frequency offsets. The differential demodulator circuitry may observe a number of previous symbols L to determine a current operation mode. With an increasing number of previous symbols L the SNR may increase, especially for the clean signal. The differential demodulator circuitry may be configured to demodulate the receive signal using a multi-symbol-differential (MSD) algorithm mode and a number of differential phases used by the multi-symbol-differential algorithm for demodulating the receive signal may depend on the operation mode adjusted by the control circuitry 32. Several different phases may be calculated for the MSD algorithm as follows $$\hat{\varphi}_k^{(1)} = \theta_k - \theta_{k-1},$$
$$\hat{\varphi}_k^{(2)} = \theta_k - \theta_{k-} - \hat{\varphi}_{k-1},$$
$$\ldots$$
$$\hat{\varphi}_k^{(L)} = \theta_k - \theta_{k-} - \sum_{l=1}^{L-1} \hat{\varphi}_{k-l},$$

where $\theta$ is the received phase, $\hat{\varphi}_k$ is the estimated differential phase and L is the number of previous symbols. L may be any number of desired previous symbols, e.g. 1, 4 or 6.

The current differential phase may be extracted by averaging the terms to $$\hat{\varphi}_k = \frac{1}{L}\sum_{l=1}^{L} \hat{\varphi}_k^{(l)}.$$

This may average the noise resulting in an increase of the performance of the differential demodulator circuity with growing L. For example, the performance of the differential demodulator may tend to optimality with growing L.

However, the frequency offset may depend on L too. An error caused by the frequency offset may be given by $$e = \frac{1}{L}\sum_{l=1}^{L} \omega_o l.$$

Thus, the error caused by the frequency offset may also grow with L. Therefore, the achievable SNR may depend on the frequency offset of the receive signal. For example, for the clean signal (e.g. small frequency drift) the operation mode of the differential demodulator circuitry may be chosen to L=6, resulting in the improved SNR. Alternatively, for the dirty signal (e.g. large frequency drift) the operation mode of the differential demodulator circuitry may be chosen to L=1, resulting in the improved SNR. Thus, the SNR may crucially depend on the operation mode of the differential demodulator circuitry and the frequency offset. With the determined frequency offset and/or the modulation index the operation mode of the differential demodulator circuitry may be adjusted, which may improve the performance of the BT receiver 30. The differential demodulator circuitry may change the operation mode dynamically based on the information of the frequency offset from the phase lock detector circuitry.

The processing circuitry 34 may comprise demapper circuitry configured to determine the receive symbols and a phase error of the receive signal based on the demodulated receive signal. Further, the processing circuitry 34 may comprise phase tracker circuitry configured to determine a phase correction signal for the demodulated receive signal based on the phase error of the receive signal. Further the control circuitry 32 may be configured to adjust an operation mode of the phase tracker based on the determined frequency offset.

The BT receiver 30 may further comprise a signal combiner circuitry coupled between the differential demodulator circuitry and the demapper circuitry, wherein the signal combiner circuitry is configured to combine the demodulated receive signal with the phase correction signal.

The phase tracker circuitry may be a circuitry with different operation modes, thus the operation mode of the phase lock track circuitry may be adjustable, e.g. by the controlling circuitry. The different operation modes may be optimized for different frequency drifts. For example, the phase tracker circuitry may perform a tracking loop, e.g. a second order tracking loop. The tracking loop may depend on tracking parameters, e.g. an integral gain (also referred to as k-proportional, KP) and/or an integral proportional gain (also referred to as k-integrated proportional, KIP). KP and KIP may determine a speed of the tracking loop. For small tracking loop speed the SNR may be increased, because due to the slow tracking loop speed the noise may be averaged, but the small tracking loop speed may be not sensitive for the frequency drift. For high tracking loop speed the SNR may be decreased, because the high tracking loop speed may add noise to the signal, but therefore it may be sensitive for the frequency drift. The control circuitry 32 is configured to adjust the operation mode of the phase tracker circuitry by adjusting at least one of an integral gain and an integral proportional gain of the phase tracker circuitry based on the determined frequency offset. The integral gain and the integral proportional gain may be dynamically changed by the control circuitry 32. For example, the operation mode of the phase tracker circuitry may be chosen based e.g. on the frequency drift determined by the phase lock detector.

An electronic device 90 may comprise a BT receiver 30 as described above. The electronic device 90 may be a mobile device such as, e.g., a mobile phone, a smart phone, a tablet-computer or a laptop-computer.

More details and aspects are mentioned in connection with the examples described below. The example shown in FIG. 1 may comprise one or more optional additional features corresponding to one or more aspects mentioned in connection with the proposed concept or one or more examples described below (e.g. FIG. 2-10).

Figure 2:
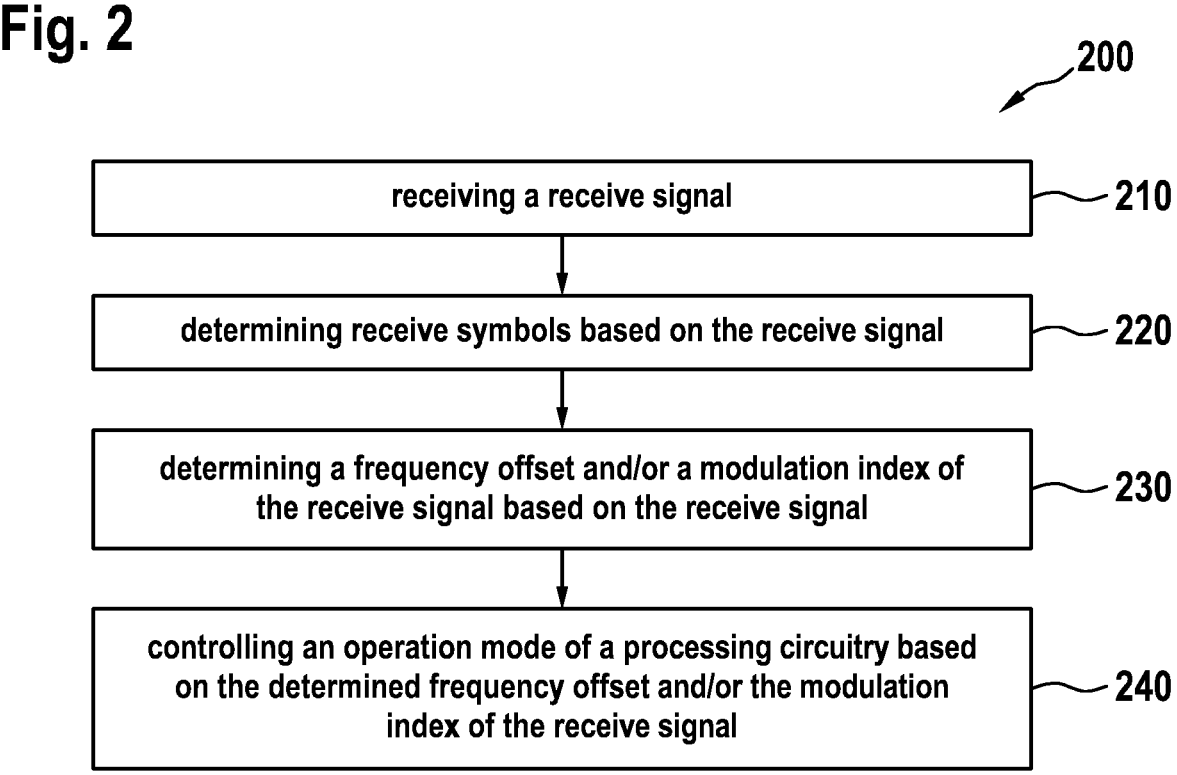
FIG. 2 shows a flow-chart of an example of a method for improving a performance of a BT receiver.

FIG. 2 shows a block diagram of a flow chart of an example of a method 200 for improving a performance of a BT receiver. The method 200 for improving the performance of the BT receiver comprises receiving 210 a receive signal, determining 220 receive symbols based on the receive signal and determining 230 a frequency offset and/or a modulation index of the receive signal based on the receive signal. Further the method comprises controlling 240 an operation mode of a processing circuitry based on the determined frequency offset and/or the modulation index of the receive signal.

More details and aspects are mentioned in connection with the examples described above and/or below. The example shown in FIG. 2 may comprise one or more optional additional features corresponding to one or more aspects mentioned in connection with the proposed concept or one or more examples described above (e.g. FIG. 1) and/or below (e.g. FIG. 3-10).

Figure 3:
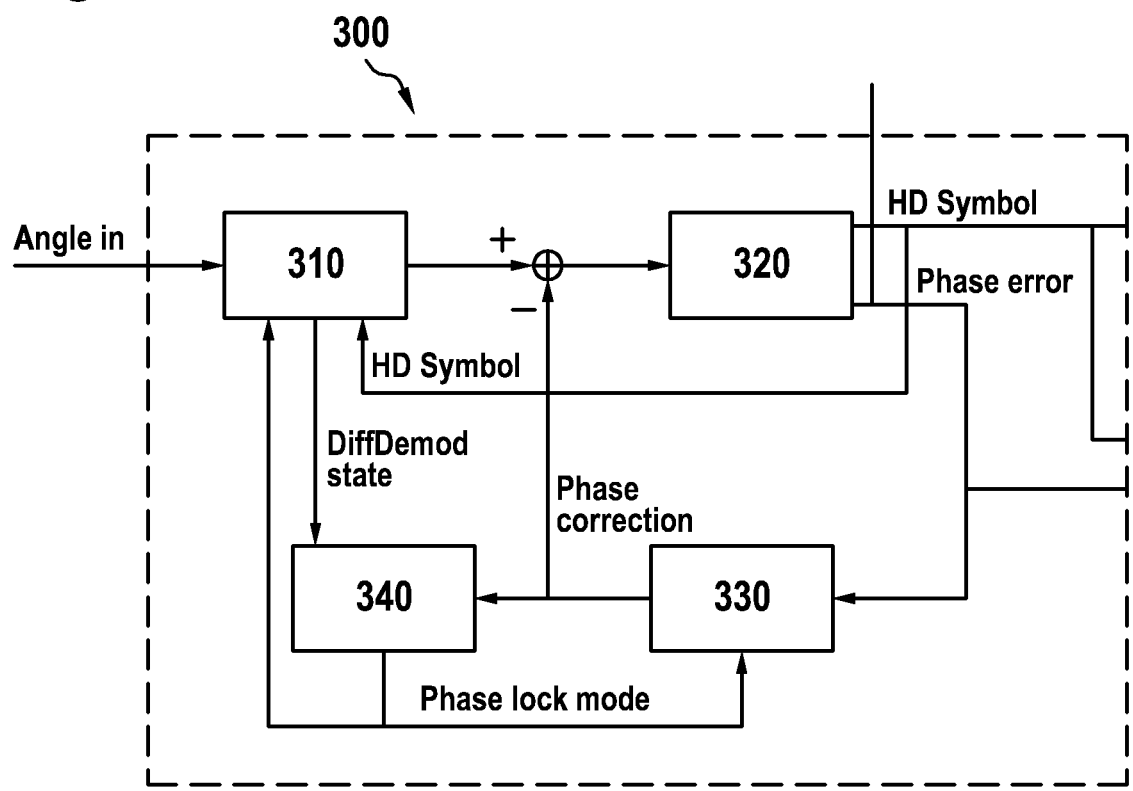
FIG. 3 shows a block schema of an example of a BT receiver.

FIG. 3 shows a block schema of an example of a BT receiver 300. The BT receiver 300 comprises a differential demodulator circuitry 310, a demapper circuitry 320, a phase tracker circuitry 330 and a phase lock detector circuitry 340. The BT receiver 300 may comprises further circuitry—conventional or custom.

The differential demodulator circuitry 310 be configured to demodulate a received receive signal. The demodulated receive signal may be send from the demodulator circuitry 310 to the demapper circuitry 320. The demapper circuitry 320 may be configured to determine receive symbols and a phase error of the demodulated receive signal. The phase error determined by the demapper circuitry 320 may be send to the phase tracker circuitry 330. The phase tracker circuitry 330 may perform a tracking loop on the demodulated received signal to determine a phase correction, e.g. a frequency offset or a frequency drift. A differential phase as seen by the phase tracker circuitry may represent the frequency offset. The phase correction may be sent to the phase lock detector circuitry 340. The phase lock detector circuitry 340 may determine a variation of the frequency offset over time, e.g. the frequency drift. Information belonging the variation of the frequency offset may be sent to the differential demodulator circuitry 310 and the phase tracker circuitry 330 and may be used to adjust an operation mode of each. Thus, a performance of the BT receiver may be improved.

The processing circuitry may comprise the demodulator circuitry 310, the demapper circuitry 320 and the phase tracker circuitry 330. For example, the demodulator circuitry 310, the demapper circuitry 320 and the phase tracker circuitry 330 may be sub-circuitry of the processing circuitry. The control circuitry may comprise the phase lock detector circuitry 340. For example, the phase lock detector circuitry may be sub-circuitry of the control circuitry.

More details and aspects are mentioned in connection with the examples described above and/or below. The example shown in FIG. 3 may comprise one or more optional additional features corresponding to one or more aspects mentioned in connection with the proposed concept or one or more examples described above (e.g. FIG. 1-2) and/or below (e.g. FIG. 4-10).

Figure 4:
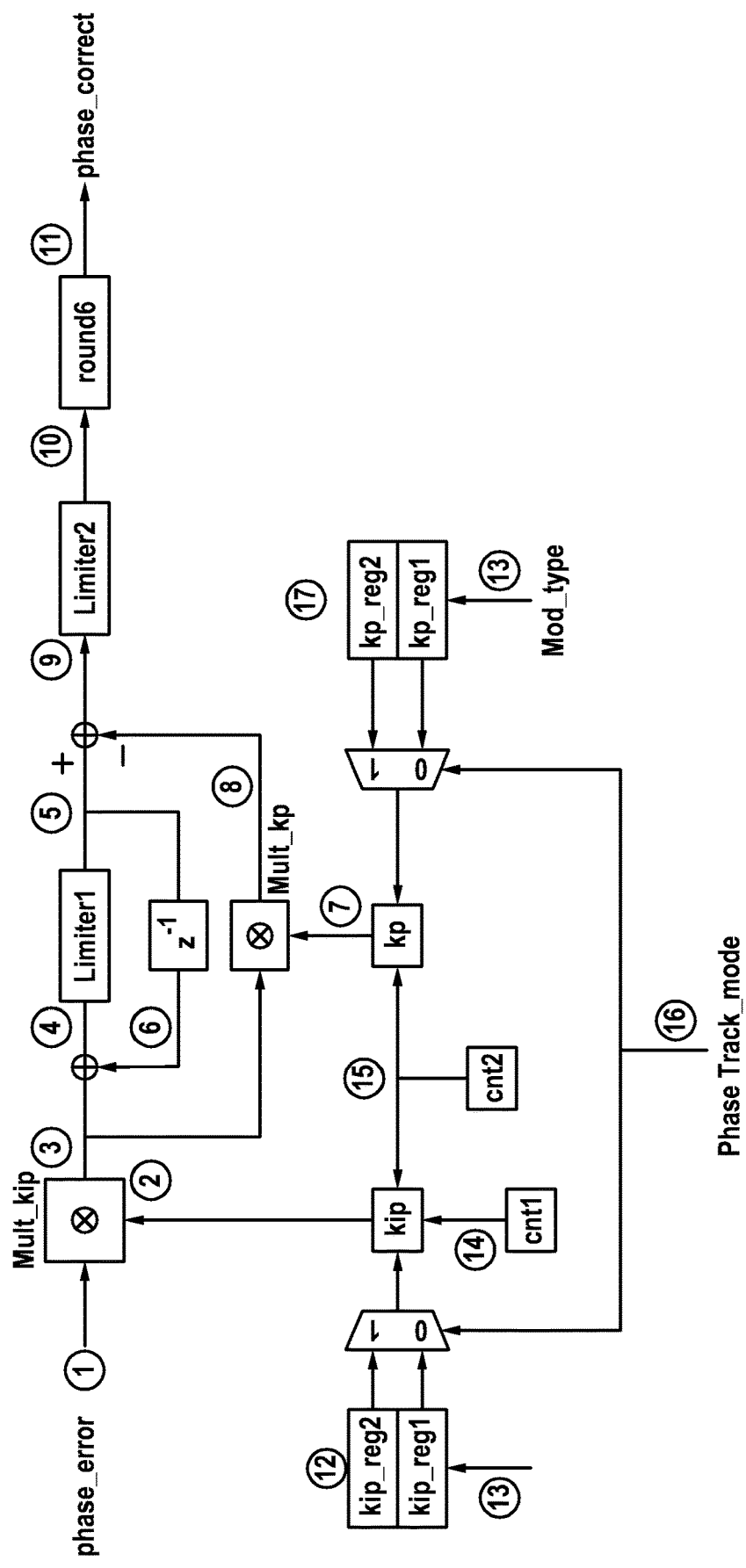
FIG. 4 shows a flow-chart of an example of an operation of a phase tracker circuitry.

FIG. 4 shows a flow-chart of an example of an operation of a phase tracker circuitry. The phase tracker circuitry may determine a phase correction based on a phase error. The determination of the phase correction may be performed by a first tracking loop. For the first tracking loop predefined values of the tracking parameters KP and KIP may be utilized. For example, the phase tracker circuitry may operate in an acquisition mode, where the tracking parameters may be reduced, until they may reach a specific predefined value. The first tracking loop may comprise all action related to the numbers 1-11. The numbers 1-11 may illustrates action.

After receiving information about a frequency drift from the phase lock detector circuitry (see number 13 and 16) a second tracking loop may be performed. For the second tracking loop the values for KP and/or KIP may be dynamically changed (compare numbers 12-17), e.g. based on the determined frequency drift. For example, the operation mode of the phase tracker circuitry may be adapted by dynamically changing the values of KP and/or KIP. The second tracking loop may comprise all actions related to the numbers 1-17. Note "reg" and "cnt" may be desired regulator and counter values.

More details and aspects are mentioned in connection with the examples described above and/or below. The example shown in FIG. 4 may comprise one or more optional additional features corresponding to one or more aspects mentioned in connection with the proposed concept or one or more examples described above (e.g. FIG. 1-3) and/or below (e.g. FIG. 5-10).

Figure 5:
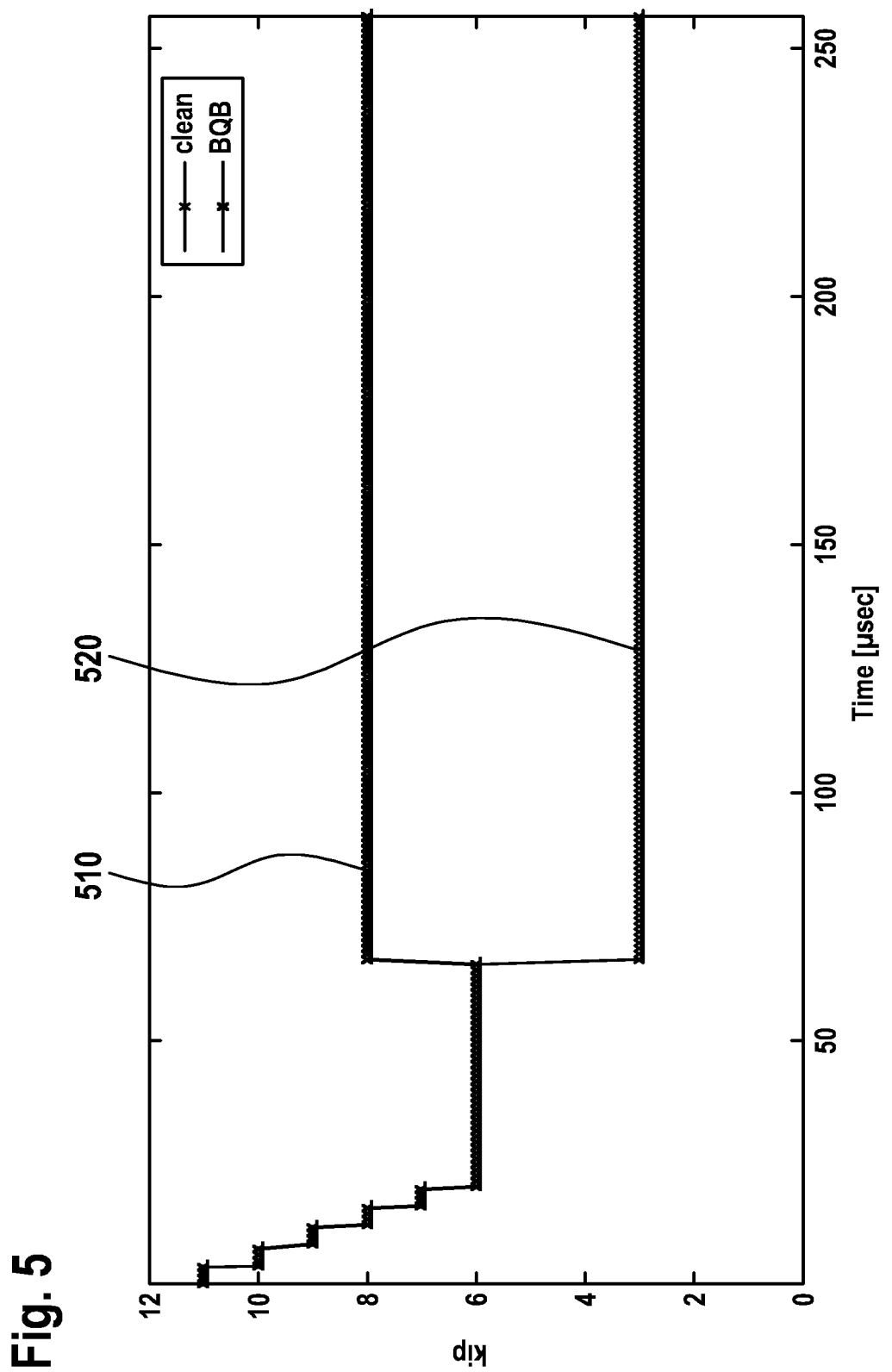
FIG. 5 shows an example of a determination of a k-integrated proportional parameter.

FIG. 5 shows an example of a determination of a k-integrated proportional parameter. The KIP is determined for a signal with stable frequency 520 (e.g. a clean signal) and for a BQB signal with large frequency drift 510 as defined by standard qualification test (e.g. a dirty signal). For the clean signal 520 the KIP may be adjusted to a value of 3 by the (adaptive) phase tracker circuitry. For the dirty signal 510 the KIP may be adjusted to a value of 8 by the (adaptive) phase tracker circuitry. Thus, an operation mode of the (adaptive) phase tracker circuitry may be improved by the dynamical change of the KIP parameter.

More details and aspects are mentioned in connection with the examples described above and/or below. The example shown in FIG. 5 may comprise one or more optional additional features corresponding to one or more aspects mentioned in connection with the proposed concept or one or more examples described above (e.g. FIG. 1-4) and/or below (e.g. FIG. 6-10).

Figure 6:
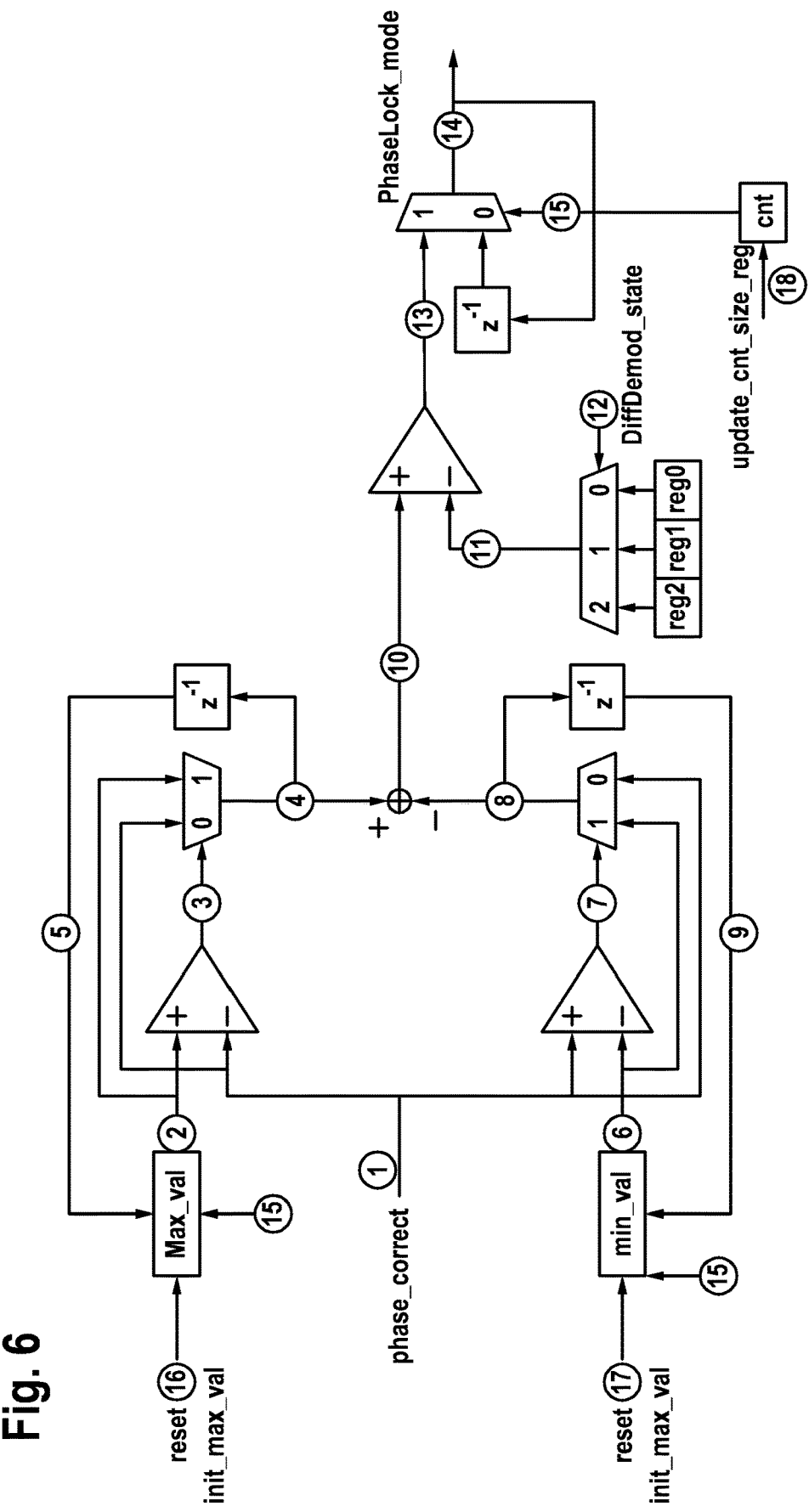
FIG. 6 shows a flow-chart of an example of a determination of a frequency offset by a phase lock detector circuitry.

FIG. 6 shows a flow-chart of an example of a determination of a frequency offset by a phase lock detector circuitry. The phase lock detector circuitry may determine a frequency offset, e.g. the frequency offset over time (frequency drift), based on a phase correction send by a phase tracker circuitry. The phase lock detector circuitry may determine a minimum (min_val) and a maximum frequency value (Max_val) based on the phase correction (numbers 1-9). The min_val and the Max_val may be used to determine the frequency offset and to generate an output signal comprising information about the frequency offset (numbers 10-14). The output signal may be sent to the phase tracker circuitry and a differential demodulator circuitry to adjust an operation mode of these circuitries. The min_val and the Max_val may be determined for a predefined time period, e.g. for 32 symbols of a receive signal. After determination of the min_val and the Max_val for a first time period, these values may be reset (number 16 and 17) and may be determined for a second time period, analog to the determination for the first time period. Further, a counter may be updated after each time period (number 18).

More details and aspects are mentioned in connection with the examples described above and/or below. The example shown in FIG. 6 may comprise one or more optional additional features corresponding to one or more aspects mentioned in connection with the proposed concept or one or more examples described above (e.g. FIG. 1-5) and/or below (e.g. FIG. 7-10).

Figure 7:
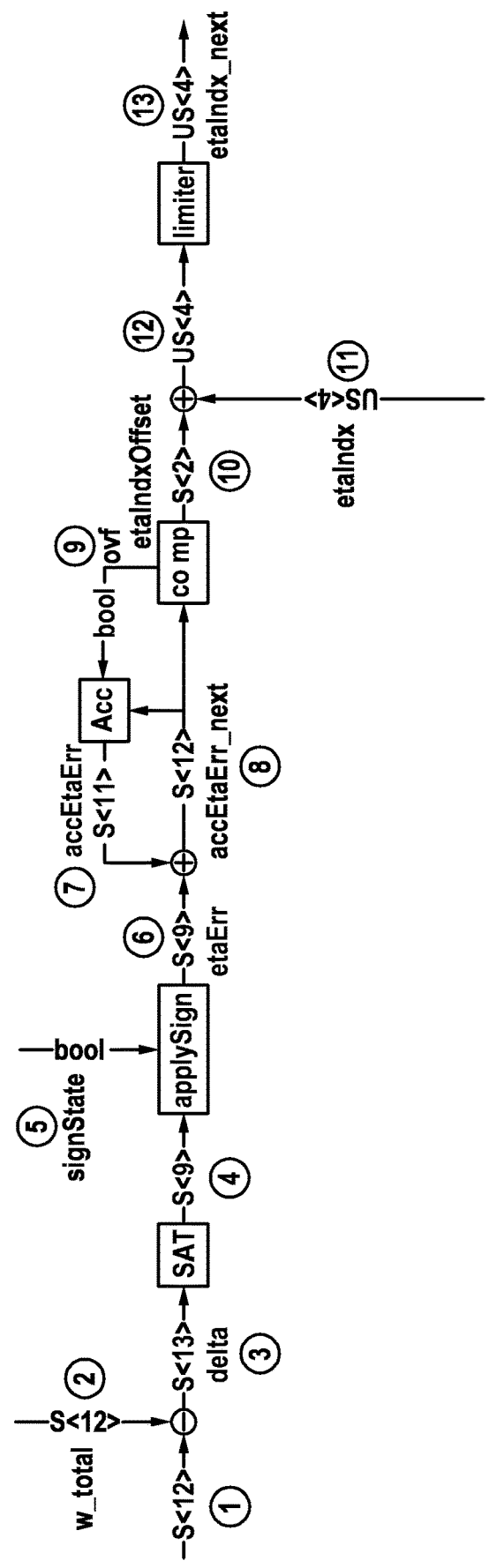
FIG. 7 shows a flow-chart of an example of a determination of a modulation index by a modulation index tracker circuitry.

FIG. 7 shows a flow-chart of an example of a determination of a modulation index by a modulation index tracker circuitry. The mathematic formalism behind the modulation index tracker circuitry is described above.

More details and aspects are mentioned in connection with the examples described above and/or below. The example shown in FIG. 7 may comprise one or more optional additional features corresponding to one or more aspects mentioned in connection with the proposed concept or one or more examples described above (e.g. FIG. 1-6) and/or below (e.g. FIG. 8-10).

Figure 8:
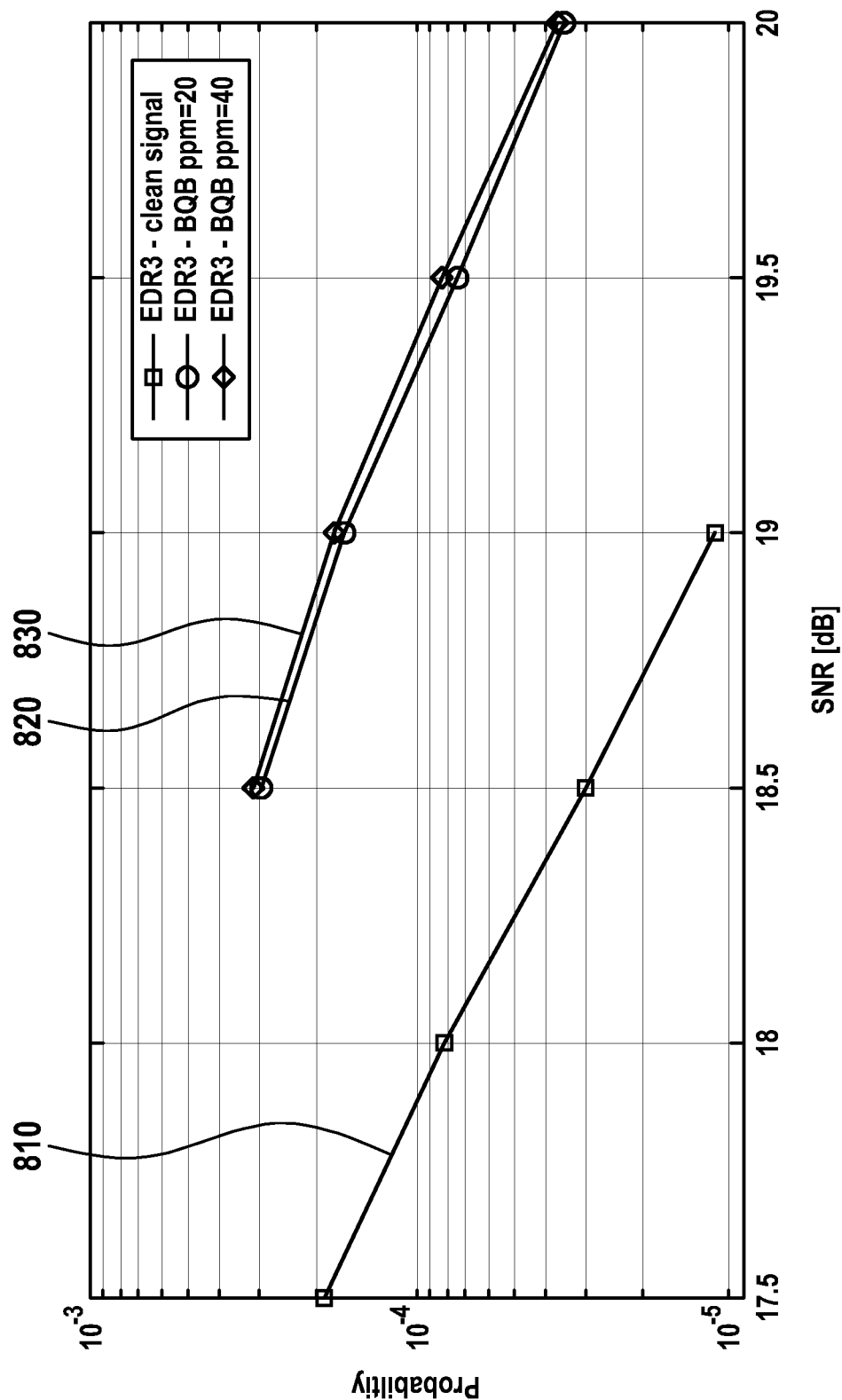
FIG. 8 shows a performance of an example of a BT receiver for different signals.

FIG. 8 shows a performance of an example of a BT receiver for different signals. The BT receiver is an adaptive BT receiver as described above, with a differential demodulator circuitry and a phase tracker circuitry, each with different operation modes. In FIG. 8 is the performance shown for an EDR-3 clean signal 810, EDR-3 BQB signal (ppm=20; parts per million) and EDR-3 BQB (ppm=40). In comparison to a non-adaptive BT receiver with a single operation mode the adaptive BT receiver shows an increased performance (see Tab. 1).

TABLE 1

Performance of the adaptive BT receiver and the non-adaptive BT receiver.

| Test | Non-adaptive [db] | Adaptive [dB | Gain [dB] |
|---|---|---|---|
| Clean signal | 19.3 | 17.9 | 1.4 |
| BQB signal | 19.7 | 19.3-19.35 | 0.4 |

For the clean signal, an improvement of 1.4 dB may be achieved by larger L value in the differential demodulator circuitry (6 instead of 4) and optimized tracking parameters for slow tracking. Better performance may also be reported for BQB signal as the tracking parameters of a tracking loop may be changed to match fast tracking. It may also be seen that for the non-adaptive receiver there may be only 0.4 dB difference between the clean and BQB test, where the adaptive receiver has 1.4 dB difference. Thus, the adaptive BT receiver may have improved performance in comparison to the non-adaptive BT receiver.

More details and aspects are mentioned in connection with the examples described above and/or below. The example shown in FIG. 8 may comprise one or more optional additional features corresponding to one or more aspects mentioned in connection with the proposed concept or one or more examples described above (e.g. FIG. 1-7) and/or below (e.g. FIG. 9-10).

Figure 9:
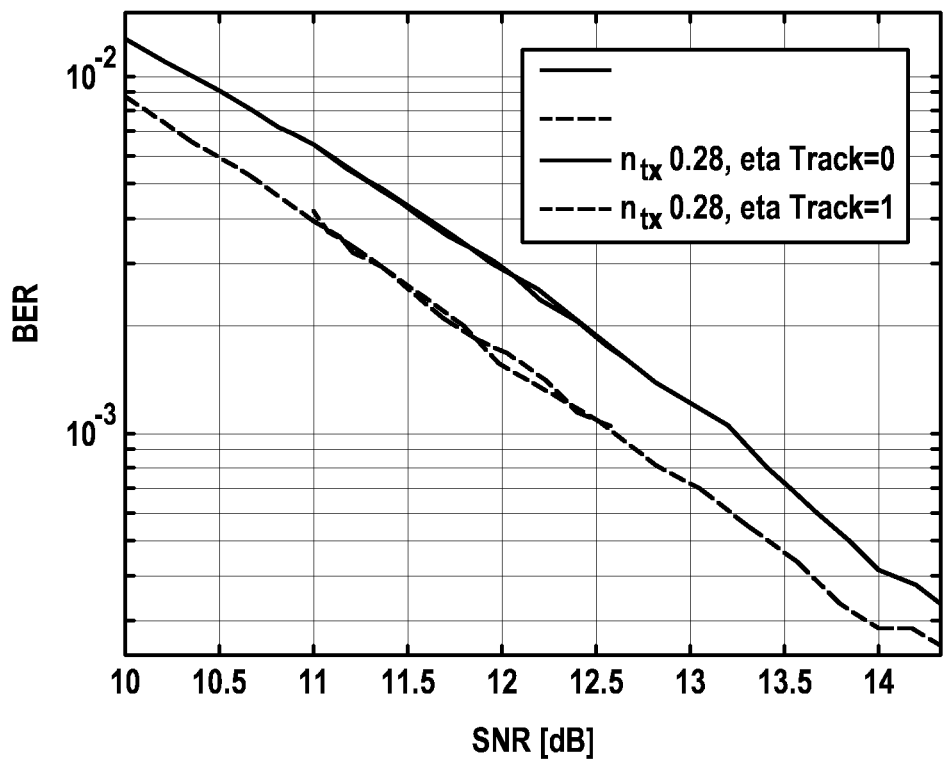
FIG. 9 shows a bit error rate as a function of the signal to noise ratio of an example of a BT receiver.

FIG. 9 shows a bit error rate (BER) as a function of the signal to noise ratio of an example of a BT receiver. The BER decreases for a BT BR signal for an adaptive BT receiver by adjusting parameters of a tracking loop.

More details and aspects are mentioned in connection with the examples described above and/or below. The example shown in FIG. 9 may comprise one or more optional additional features corresponding to one or more aspects mentioned in connection with the proposed concept or one or more examples described above (e.g. FIG. 1-8) and/or below (e.g. FIG. 10).

Figure 10:
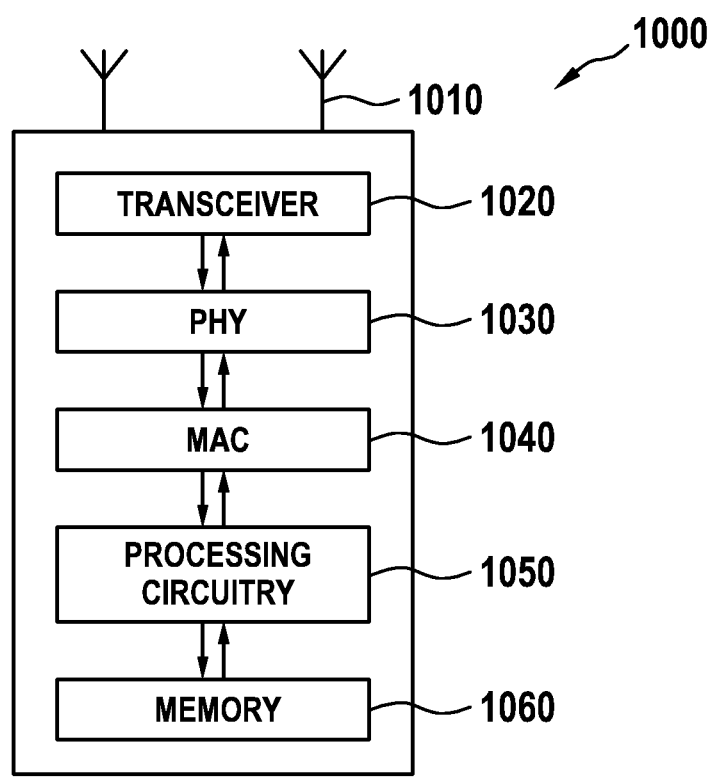
FIG. 10 shows a block diagram of an example of a wireless communication device.

FIG. 10 shows a block diagram of an example of a wireless communication device 1000. In accordance with various examples, wireless communication device 1000 may include, among other things, a transmit/receive element 1010 (for example an antenna), a transceiver 1020, physical (PHY) circuitry 1030, and media access control (MAC) circuitry 1040. The PHY circuitry 1030 and MAC circuitry 1040 may be compliant with one or more wireless standards such as IEEE 802.11 standards and/or BT™ (Low Energy). The PHY circuitry 1030 may include circuitry for modulation/demodulation, upconversion/downconversion, filtering, amplification, etc. In some examples, the transmit/receive elements 1010 may be two or more antennas that may be coupled to the PHY circuitry 1030 and arranged for sending and receiving signals.

Wireless communication device 1000 may also include processing circuitry 1050 and memory 1060 configured to perform the various operations described herein. The circuitry 1050 may be configured to perform functions based on instructions being stored in a RAM or ROM, or based on special purpose circuitry. The circuitry 1050 may include one or more processors, such as a general-purpose processor or special purpose processor, and/or processing circuitry in accordance with some examples. The circuitry 1050 may implement one or more functions associated with the transceiver 1020, the PHY circuitry 1030, the MAC circuitry 1040, and/or the memory 1060. The circuitry 1050 may be coupled to the transceiver 1020, which may be coupled to the transmit/receive element 1010. While FIG. 10 depicts the circuitry 1050 and the transceiver 1020 as separate components, the circuitry 1050 and the transceiver 1020 may be integrated together in an electronic package or chip.

In some examples, a wireless communication device 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as BT or IEEE 802.11, or other device that may receive and/or transmit information wirelessly. In some examples, the wireless communication device may include one or more of a keyboard, a display, anon-volatile memory port, multiple antennas, a graphics processor, an application processor, speakers, and other mobile device elements. The display may be an LCD screen including a touch screen.

Although the Wireless communication device 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some examples, the functional elements may refer to one or more processes operating on one or more processing elements.

Some examples may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1000 to perform the methods and/or operations described herein.

The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

More details and aspects are mentioned in connection with the examples described above. The example shown in FIG. 10 may comprise one or more optional additional features corresponding to one or more aspects mentioned in connection with the proposed concept or one or more examples described above (e.g. FIG. 1-9).

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The examples described herein may be summarized as follows:

Example 1 is a Bluetooth receiver, comprising: processing circuitry configured to receive a receive signal and to determine receive symbols based on the receive signal; and control circuitry configured to determine a frequency offset and/or a modulation index of the receive signal based on the receive signal, and to control an operation mode of the processing circuitry based on the determined frequency offset and/or the modulation index of the receive signal.

Example 2 is the Bluetooth receiver according to example 1, wherein the control circuitry comprises phase lock detector circuitry configured to determine the frequency offset of the receive signal based on a frequency of the receive signal.

Example 3 is the Bluetooth receiver according to example 2, wherein the phase lock detector circuitry is configured to determine the frequency offset of the receive signal based on a maximum frequency and a minimum frequency of the receive signal.

Example 4 is the Bluetooth receiver according to any one of examples 2-3, wherein
the phase lock detector circuitry is further configured to determine the frequency offset of the receive signal based on a frequency drift of the receive signal over time.

Example 5 is the Bluetooth receiver according to any one of examples 2-4, wherein the phase lock detector circuitry is further configured to compare the frequency offset with a threshold, and if the frequency offset is larger than the threshold, send the determined frequency offset to the processing circuitry.

Example 6 is the Bluetooth receiver according to any one of the preceding examples, wherein the control circuitry comprises a modulation index tracker circuitry configured to determine the modulation index of the receive signal.

Example 7 is the Bluetooth receiver according to example 6, wherein the modulation index tracker circuitry is further configured to determine the modulation index based on a modulation error of the receive signal.

Example 8 is the Bluetooth receiver according to example 7, wherein the modulation index tracker circuitry is further configured to determine the modulation index based on an averaging factor.

Example 9 is the Bluetooth receiver according to any one of examples 6-8, wherein the modulation index tracker circuitry is further configured to determine the modulation index based on a phase error of the received signal.

Example 10 is the Bluetooth receiver according to example 9, wherein the modulation index tracker circuitry is further configured to determine the phase error of the received signal based on a modulation error of the received signal.

Example 11 is the Bluetooth receiver according to any one of the preceding examples, wherein the processing circuitry comprises differential demodulator circuitry configured to generate a demodulated receive signal by demodulating the receive signal; and the control circuitry is configured to adjust an operation mode of the differential demodulator circuitry based on the determined frequency offset and/or the modulation index.

Example 12 is the Bluetooth receiver according to example 10, wherein the differential demodulator circuitry is configured to demodulate the receive signal using a multi-symbol-differential algorithm mode; and a number of differential phases used by the multi-symbol-differential algorithm for demodulating the receive signal depends on the operation mode adjusted by the control circuitry.

Example 13 is the Bluetooth receiver according to example 11 or example 12, wherein the processing circuitry comprises demapper circuitry configured to determine the receive symbols and a phase error of the receive signal based on the demodulated receive signal; the processing circuitry comprises phase tracker circuitry configured to determine a phase correction signal for the demodulated receive signal based on the phase error of the receive signal; and the control circuitry is configured to adjust an operation mode of the phase tracker based on the determined frequency offset.

Example 14 is the Bluetooth receiver according to example 13, further comprising: signal combiner circuitry coupled between the differential demodulator circuitry and the demapper circuitry, wherein the signal combiner circuitry is configured to combine the demodulated receive signal with the phase correction signal.

Example 15 is the Bluetooth receiver according to example 13 or example 14, wherein the control circuitry is configured to adjust the operation mode of the phase tracker circuitry by adjusting at least one of an integral gain and an integral proportional gain of the phase tracker circuitry based on the determined frequency offset.

Example 16 is an electronic device comprising a Bluetooth receiver according to any one of the preceding examples.

Example 17 is the electronic device of example 16, wherein the electronic device is a mobile device.

Example 18 is a method for a Bluetooth receiver, comprising: receiving a receive signal;
determining receive symbols based on the receive signal; determining a frequency offset and/or a modulation index of the receive signal based on the receive signal; and controlling an operation mode of a processing circuitry based on the determined frequency offset and/or the modulation index of the receive signal.

The following examples are hereby incorporated in the detailed description, wherein each example may stand on its own as a separate example. It should also be noted that although in the examples a dependent example refers to a particular combination with one or more other examples, other examples may also include a combination of the dependent example with the subject matter of any other dependent or independent example. Such combinations are hereby explicitly proposed, unless it is stated in the individual case that a particular combination is not intended. Furthermore, features of an example should also be included for any other independent example, even if that example is not directly defined as dependent on that other independent example.

What is claimed is:

1. A Bluetooth receiver, comprising:
processing circuitry configured to receive a receive signal and to determine receive symbols based on the receive signal; and
control circuitry configured to determine a frequency offset and/or a modulation index of the receive signal based on the receive signal,
wherein the control circuitry comprises phase lock detector circuitry configured to determine the frequency offset of the receive signal based on a maximum frequency and a minimum frequency of the receive signal, and control an operation mode of the processing circuitry based on the determined frequency offset and/or the modulation index of the receive signal.

2. The Bluetooth receiver according to claim 1, wherein the phase lock detector circuitry is further configured to determine the frequency offset of the receive signal based on a frequency drift of the receive signal over time.

3. The Bluetooth receiver according to claim 1, wherein the phase lock detector circuitry is further configured to compare the frequency offset with a threshold, and
if the frequency offset is larger than the threshold, send the determined frequency offset to the processing circuitry.

4. The Bluetooth receiver according to claim 1, wherein the control circuitry comprises a modulation index tracker circuitry configured to determine the modulation index of the receive signal.

5. The Bluetooth receiver according to claim 4, wherein wherein the modulation index tracker circuitry is further configured to determine the
modulation index based on a modulation error of the receive signal.

6. The Bluetooth receiver according to claim 5, wherein the modulation index tracker circuitry is further configured to determine the modulation index based on an averaging factor.

7. The Bluetooth receiver according to claim 4, wherein the modulation index tracker circuitry is further configured to determine the modulation
index based on a phase error of the receive signal.

8. The Bluetooth receiver according to claim 7, wherein the modulation index tracker circuitry is further configured to determine the phase error of the receive signal based on a modulation error of the received signal.

9. The Bluetooth receiver according to claim 1, wherein the processing circuitry comprises differential demodulator circuitry configured to generate a demodulated receive signal by demodulating the receive signal; and
the control circuitry is configured to adjust an operation mode of the differential demodulator circuitry based on the determined frequency offset and/or the modulation index.

10. The Bluetooth receiver according to claim 9, wherein the differential demodulator circuitry is configured to demodulate the receive signal using a multi-symbol-differential algorithm mode; and
a number of differential phases used by the multi-symbol-differential algorithm for demodulating the receive signal depends on the operation mode adjusted by the control circuitry.

11. The Bluetooth receiver according to claim 9, wherein the processing circuitry comprises demapper circuitry configured to determine the receive symbols and a phase error of the receive signal based on the demodulated receive signal;
the processing circuitry comprises phase tracker circuitry configured to determine a phase correction signal for the demodulated receive signal based on the phase error of the receive signal; and
the control circuitry is configured to adjust an operation mode of the phase tracker circuitry based on the determined frequency offset.

12. The Bluetooth receiver according to claim 11, further comprising
signal combiner circuitry coupled between the differential demodulator circuitry and
the demapper circuitry, wherein the signal combiner circuitry is configured to combine
the demodulated receive signal with the phase correction signal.

13. The Bluetooth receiver according to claim 11, wherein the control circuitry is configured to adjust the operation mode of the phase tracker circuitry by adjusting at least one of an integral gain and an integral proportional gain
of the phase tracker circuitry based on the determined frequency offset.

14. An electronic device comprising a Bluetooth receiver according to claim 1.

15. A method for a Bluetooth receiver, comprising:
receiving a receive signal;
determining receive symbols based on the receive signal;
determining a frequency offset and a modulation index of the receive signal based on the receive signal,
wherein determining the frequency offset of the receive signal is based on a maximum frequency and a minimum frequency of the receive signal; and
controlling an operation mode of a processing circuitry based on the determined frequency offset and/or the modulation index of the receive signal.

16. A non-transitory, computer-readable medium comprising a program code that, when the program code is executed on a computer, a processor, or a programmable hardware component, performs:
receiving a receive signal;
determining receive symbols based on the receive signal
determining a frequency offset and a modulation index of the receive signal based on the receive signal,
wherein determining the frequency offset of the receive signal is based on a maximum frequency and a minimum frequency of the receive signal; and
controlling an operation mode of a processing circuitry based on the determined frequency offset and the modulation index of the receive signal.

* * * * *